April 2, 1963 E. V. BALLOU ET AL 3,084,030
POTENTIOMETRIC PROCESS
Filed Dec. 30, 1959
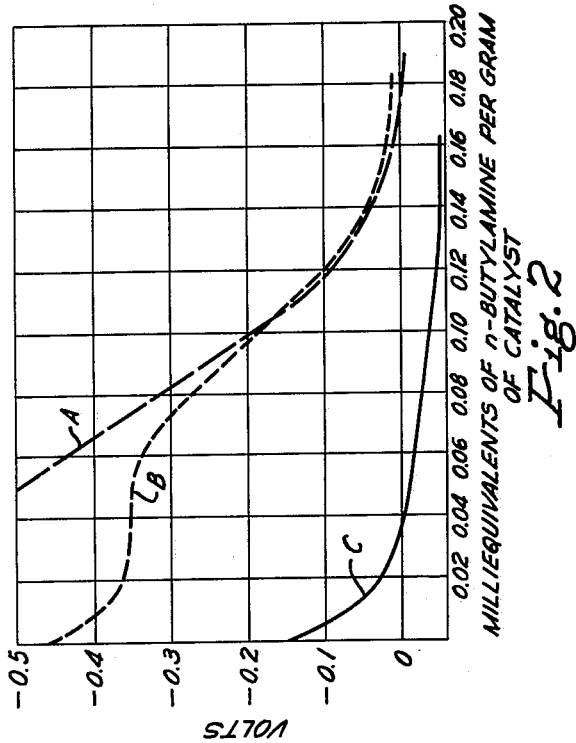
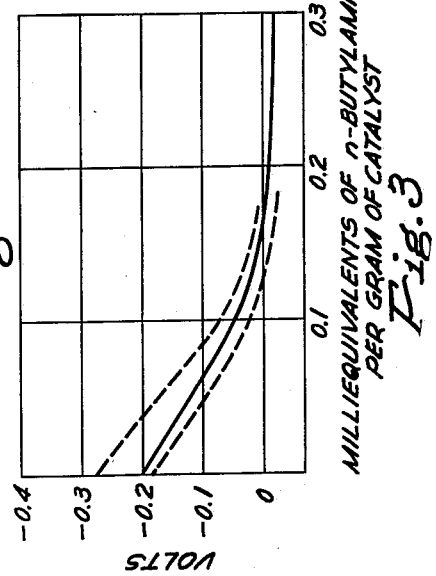
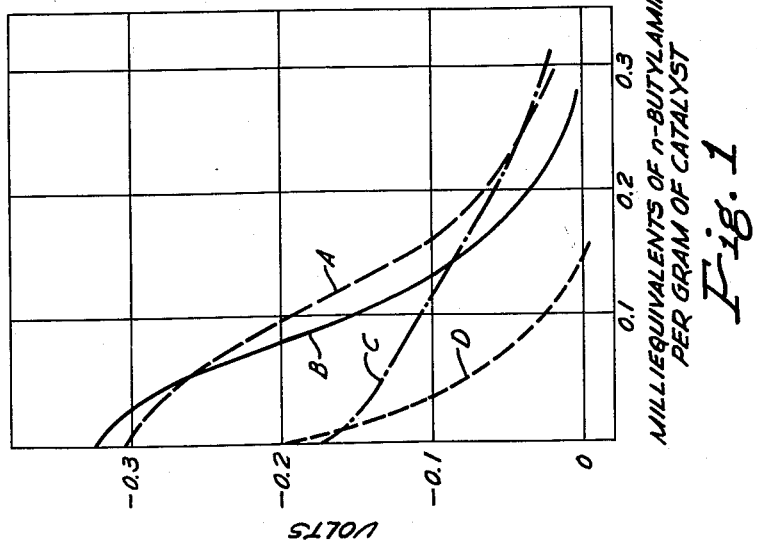
INVENTORS
EDWARD V. BALLOU
RALPH T. BARTH
BY RALPH O. CLARK
ATTORNEY

United States Patent Office 3,084,030
Patented Apr. 2, 1963

3,084,030
POTENTIOMETRIC PROCESS
Edward V. Ballou, Pittsburgh, Ralph T. Barth, North Braddock, and Ralph O. Clark, Verona, Pa., assignors to Gulf Research & Development Company, Pittsburgh, Pa., a corporation of Delaware
Filed Dec. 30, 1959, Ser. No. 863,019
13 Claims. (Cl. 23—230)

This invention relates to a process for the measuring of electrolytic potential of a liquid dispersion medium in contact with a solid material.

According to the prior art, measurement of acidity of a solid has been performed indirectly by dispersing the solid in a liquid with which it reacts and measuring the potential of the liquid before and after reaction with the solid. In this manner the only acidity characteristic of the solid that could be determined was the total acidity. In contrast to the prior art, by employing the novel liquid dispersion medium and process of this invention for the solid material being tested, the measurement of electrolytic potential during titration reveals other important characteristics of the solid material in addition to total acidity such as, for example, the ratio of strong to weak acid sites in the solid.

The dispersion medium to be employed in accordance with this invention for the solid being tested is an aliphatic liquid nitrile such as acetonitrile, propionitrile, butyronitrile, etc. Acetonitrile is preferred. Such liquids are highly inert with respect to acidic solids and exhibit substantially no measurable potential in the absence of an acidic solid material. However, when electrodes in circuit with a potentiometer are immersed in such a liquid having a suspended acidic solid, the potential measured correlates remarkably well with acidity characteristics of the solid alone as determined by other methods.

The process of this invention comprises immersing electrodes which are in circuit with a potentiometer into a suspension of granulated solid material having a particle size less than 74 microns in liquid nitrile, said suspension containing at least 0.5 gram and preferably at least 1 gram of granulated solid per 150 milliliters of suspension volume. Any type of potentiometer is employed to measure the potential between the immersed electrodes as, for example, a direct reading type potentiometer of the indicating or recording type or a manual balancing type potentiometer.

A particularly important application of this invention involves measuring the total strength of acid sites and the relative proportion of strong and weak acid sites on solid materials employed as catalysts. Acid sites determine the activity of a catalyst toward carbonium ion type reactions such as cracking, isomerization, etc. In some catalysts the presence of acid sites is desirable and in others it is important that acid sites be absent so that undesirable reactions will not be catalyzed to interfere with a main reaction that is being carried out. Whatever the use of a catalyst, a measure of the strength of its acid sites and the relative proportion of its strong and weak acid sites is often desirable. This invention comprises an acidic measuring process for solid materials which gives a much more revealing picture of the distribution and strength of acid sites than was obtainable heretofore.

Potentiometric titration involving acidic solids has in the past been carried out in a manner whereby the acid sites of the solid are first allowed to become substantially completely neutralized by reaction with an alkaline liquid followed by potentiometrically titrating the alkaline liquid to determine its loss of alkalinity. In applying this invention to a titration process such a complete intermediate reaction between the acid sites on the solid and a dispersion liquid is largely avoided. In contrast, the extent of interaction occurring between the nitrile dispersion medium and the acidic solid is very slight. This is strikingly evidenced by the fact that a liquid nitrile which has been separated by filtration or other means from an acidic solid with which it has previously been in contact exhibits a much lower potential than it exhibited when in contact with the solid and titration of thus separated liquid nitrile is impossible since the addition of a minute quantity of titrant results in complete loss of potential. The quantity of titrant required to destroy the potential of the liquid nitrile after removal from it of the solid is so small as to be difficult to measure in a practical manner.

It has been discovered that the particle size of the solid material whose potential is being measured is critical in obtaining measurements in accordance with this invention which are correlatable with results obtained by employing other methods. In accordance with this invention, the particle size of the solid material is at least as small as 74 microns.

When a fresh suspension of nitrile liquid and solid material is prepared sufficient time must be allowed for equilibrium between the solid and liquid to becmoe established prior to commencing potentiometric measurements. The attainment of equilibrium is aided by stirring. In testing a freshly prepared dispersion, it is important that the potential between the electrodes be allowed to level off to a constant value since after preparing a fresh dispersion the measured potential gradually approaches a maximum. However, once equilibrium is achieved the dispersion can be titrated continuously since reaction equilibrium is maintained with continuous addition of titrant at a reasonable rate. This is a highly advantageous characteristic of this invention and allows titrations to proceed continuously and rapidly so as to permit routine testing of large numbers of samples.

In order to achieve accurate results, at least a 1 gram sample of the solid whose acidity is being measured is employed for each 150 milliliters of dispersion volume. Smaller solid-volume ratios prdouce lower potential readings but no increase in measured potential results by employing larger solid-volume ratios. However, it is possible that useful information can be derived from titrations carried out at solid concentrations lower than 1 gram of solid per 150 milliliters of dispersion volume. For example, if a series of related solid catalysts are titrated for comparison with one another at the same low concentration, 0.5 gram of solid per 150 milliliters of dispersion volume can be employed. If the amount of sample available is limited then low concentrations may become a necessity. Only when the concentration of solid is decreased to the neighborhood of 0.1 gram per 150 milliliters of dispersion volume does the potential become difficult to detect.

The commonly employed glass type electrode should be employed for measuring potential. Highly inaccurate results were achieved when employing a hydrogen electrode wherein hydrogen gas continually flushes the electrode surface.

It is important that the potentiometric titration process of an acidic solid be performed in a non-aqueous medium since the combination of water with the surface of an acidic solid changes the structure and acidity of the solid and results in inaccurate potential measurements. Therefore, both the nitrile dispersion medium and the standard titrating liquid or titrant are essentially water free. For this reason, not only is the dispersion medium essentially anhydrous but also an essentially anhydrous organic alkaline liquid is employed as the standard titrating liquid. The organic alkaline titrating liquid and the organic nitrile dispersing liquid are selected to be miscible with each other to form a medium in which the granulated solid particles are readily dispersed without the particles being dissolved. Advantageously, the organic alkaline titrating liquid is charged in solution in a liquid which is the same nitrile being employed for dispersing the solid.

A feature of the titration process of this invention is that the rate of addition of standard titrating liquid is slower than the neutralization reaction rate between the standard titrating liquid and the solid in nitrile dispersion. This feature of the invention is important in order to obtain information available, by employing the method of this invention, concerning relative number and relative strength of strong and weak acid sites on the sample being tested from a graph of equivalents of base added versus potential readings.

It may be desirable for the solid material whose acidity is being determined to be charged to the measuring system in an anhydrous state, that is, substantially free of non-combined water, in order to insure an accurate determination of its acidity. The solid samples employed are therefore calcined at a temperature of at least 1000° F. for at least 3 hours, cooled in a relatively dry atmosphere and dispersed in an anhydrous liquid nitrile to prevent exposure to atmospheric moisture.

The measurement of acidity of a solid material such as a catalyst containing controlled amounts of moisture is often of interest. For example, it may be of interest to determine the acidity of a catalyst as it exists at 1000° F. in an environment of gas-oil vapors and 1 atmosphere pressure. Such a sample can be prepared by exposing the catalyst to gas-oil vapor at 1000° F. and 1 atmosphere pressure. The catalyst is then cooled and dispersed in the nitrile dispersion medium before it has a chance to absorb or adsorb an appreciable quantity of water from the atmosphere at room temperature. Accordingly, the expedient of dispersing the solid material in a dispersion medium is an advantageous means for protecting the moisture content of a catalyst from change prior to acidity measurement.

As a further example, one might be interested in measuring the activity of coked catalyst. Calcining would in this case remove the coke so that this pretreatment would be unsuitable. In this case the catalyst can be heated to 1000° F. in vacuo or in an atmosphere of helium or nitrogen to remove the water, cooled and dispersed in nitrile liquid before it has a chance to readsorb appreciable quantities of water. Therefore, no matter to what pretreatment the catalyst sample is to be exposed it is advantageous to dissolve the pretreated material in the dispersion medium of this invention before an opportunity for appreciable water adsorption occurs.

The process of this invention for potentiometric measurement of an acidic solid material comprises subdividing said acidic solid material to a particle size at least as small as 74 microns, dispersing said granulated calcined solid in an anhydrous liquid nitrile, at least 1 gram of said solid being employed for every 150 milliliters of dispersion volume, immersing a glass electrode which is permeable to hydrogen ions and a standard electrode into said dispersion, said electrodes being in circuit with a potentiometer, and allowing said dispersion to stand for a duration sufficient to produce a constant measured potential across said electrodes.

The process of this invention for titrating an acidic solid material comprises immersing a glass electrode which is permeable to hydrogen ions and a standard electrode, said electrodes being in circuit with a potentiometer, in a dispersion of anhydrous granulated acidic solid material having a particle size at least as small as 74 microns in an anhydrous organic liquid nitrile, at least 1 gram of said solid being employed for every 150 milliliters of dispersion volume, allowing said dispersion to stand for a duration sufficient to produce a constant potential across said electrodes, and adding an anhydrous organic standard alkaline liquid while continuously stirring the resulting mixture, the rate of addition of said organic standard alkaline liquid being slower than the rate of reaction between said alkaline liquid and said dispersion.

Following are described certain tests which were conducted to illustrate this invention. In each of these tests one gram of sample was ground to a particle size smaller than 74 microns in diameter, except for the tests wherein a different particle size is noted, and pretreated by calcination in a 25 milliliter Erlenmeyer flask for three hours at 500° C. The flask, while still in the furnace was stoppered with a standard taper stopper, then immediately placed in a desiccator to cool. It was then transferred quantitatively with reagent grade acetonitrile into a 250 milliliter beaker and diluted to a total volume of 150 milliliters. Standard glass and calomel electrodes were immersed in the slurry and a glass stirrer set to a speed just below that creating turbulence. The standard electrode employed was a calomel electrode having a mercury-mercurous chloride interface. The sensing or measuring electrode was a standard glass electrode having a glass membrane containing an aqueous buffer solution and having a silver-silver chloride interface.

Before making a final measurement or before commencing titration, an equilibration period was allowed to elapse after commencing stirring during which the potential reading gradually rose and leveled off to a constant value. In most cases five minutes were required before constant potentials were recorded, but in some instances 10 or 15 minutes were required. When titrations were performed, the standard alkaline liquid employed was 0.008 molar n-butylamine in acetonitrile and was continuously introduced below the surface of the dispersion at a constant rate of 0.4 milliliter per minute. A commercial recording titrimeter provided the mechanism for the constant rate of flow of standard alkaline liquid and the recording of the potential curve.

Tests were made to illustrate the criticality of the particle size of the solid to be employed in accordance with this invention. The tests involved the preparation of a number of 1 gram samples of a commercial silica-alumina catalyst containing 87 weight percent silica and 13 weight percent alumina, each sample being of a different particle size. A slurry of each of these samples with acetonitrile in individual beakers was then prepared and measured potentiometrically and then titrated with n-butylamine. The following table shows the initial potential measured with each sample and also shows the number of milliequivalents of n-butylamine required to reduce the initial potential to zero.

| Particle Diameters, Microns | Measured Initial Potential, Volts | Milliequivalents of n-butylamine per gram of solid required to produce zero potential |
| --- | --- | --- |
| 590–840 | −0.08 | .01 |
| 297–420 | −0.15 | .015 |
| 149–297 | −0.18 | .06 |
| 105–149 | −0.25 | .07 |
| 74–105 | −0.31 | .14 |
| 44–74 | −0.37 | .25 |
| Smaller than 44 | −0.37 | .25 |

As shown in the above table the only samples from which uniform, comparable results were obtained were those wherein the solid being measured had a particle size smaller than 74 microns.

Tests were conducted to illustrate the high accuracy of the method of this invention by comparing the acidities of three different acid catalysts measured in accordance with the method of this invention with acidity measurements of similar samples obtained by the use of color indicators. The results of the measurements made in accordance with the method of this invention are shown in FIGURE 1. Curves A, B, C and D of FIGURE 1 represent the results obtained with a silica-alumina containing 75 percent by weight silica and 25 percent by weight alumina, a silica-alumina containing 87 percent by weight silica and 13 percent by weight alumina, a silica-magnesia having the composition 70 percent by weight silica and 30 percent by weight magnesia and a commercial alumina, respectively.

Butylamine batchwise titration on a spot plate with indicators according to the method of Benesi, described in Journal of Physical Chemistry, 61, 970 (1957), disclosed that the total of the acid sites present on the silica-alumina catalyst of curve A corresponded to 0.35 milliequivalent of butylamine per gram. Curve A of FIGURE 1 corresponds well with this value since extrapolation of curve A indicates that zero potential would be reached upon the addition of approximately this number of milliequivalents of butylamine. Similarly, a similar indicator type titration had previously disclosed that the total acid sites present on the silica-alumina of curve B corresponded to 0.33 milliequivalent of butylamine. Curve B of FIGURE 1 compares favorably with this value. The surface of the silica-magnesia sample had only weak acid sites, as determined by the indicator method. As shown in curve C of FIGURE 1, this was also found to be the case when this material was titrated electrometrically in accordance with the method of this invention since the initial electrode potential was approximately only half that measured in the case of the strongly acidic solids of curve A and curve B. The silica-magnesia electrometric titration curve approached a zero potential relatively slowly, indicating a large number of weak acid sites. Comparison of curve D with curves A and B of FIGURE 1 compares favorably with the prior knowledge that alumina catalysts are less highly acidic than silica-alumina catalysts or silica-magnesia catalysts.

It is seen that the electrometric method for measuring the acidity of solid materials in accordance with this invention discloses much concerning the acid characteristics of the solid being measured which is not disclosed by other methods of measurement. For example the initial potentiometric reading indicates total electrometric potential due to acid sites on the solid. The number of milliequivalents of base required to reduce this potential to a zero potential indicates the total strength of all the acid sites in a given sample in terms of acid-base equivalents. Also, the slope of the titration curve indicates the relative number of strong and weak acid sites in the sample. For example, in a titration curve having both a steep slope and a flat slope the occurrence of the steep slope in the left hand portion of the curve indicates a relatively small proportion of the stronger acid sites and the occurrence of the flat slope in the right hand portion of the curve indicates a relatively large proportion of the weaker acid sites, and vice versa.

Additional tests were conducted to further illustrate the accuracy of the method of this invention. In these tests, a number of constant weight samples of the 87 weight percent silica—13 weight percent alumina catalyst were contacted with predetermined amounts of butylamine before the titration by shaking for three hours at room temperature. The tests showed a decreasing amount and strength of surface acid as increasing amounts of base were pre-equilibrated with the solid in this manner. For example, three samples of the 87 weight percent silica—13 weight percent alumina catalyst were pretreated with 0.5 milliequivalent of n-butylamine per gram, 0.10 milliequivalent of n-butylamine per gram and 0.15 milliequivalent of n-butylamine per gram, respectively. It was found that the greater the amount of butylamine employed during pre-equilibration, the lower the measured potential became. Also, during the titration, the milliequivalents of butylamine required to produce a zero potential was reduced by an amount corresponding approximately to the amount of butylamine used during pre-equilibration.

The results of additional tests further illustrating the accuracy of the method of this invention are shown in FIGURE 2. The curves in FIGURE 2 depict the titration according to the method of this invention of three samples of a non-porous silica, each of which has been impregnated with a different mineral acid. Curves A, B and C of FIGURE 2 represent samples impregnated with 0.1 millimole of sulfuric acid, 0.1 millimole of phosphoric acid and 0.2 millimole of boric acid, respectively, per gram of catalyst. The technique described by H. A. Benesi, J. Am. Chem. Soc., 78, 5490 (1956), was used to contact the silica with the acid in the preparation of each sample. The curves shown in FIGURE 2 indicate the strength of the acids in the correct order, the initial voltage of the sulfuric acid sample being off the scale of the instrument. If the available acid was the same as the amount impregnated, the ionizable hydrogen of the sulfuric and phosphoric acids was titrated in the range shown, but only a portion of one hydrogen of the boric acid was titrated. This concurs with the observation made by H. A. Benesi, J. Phy. Chem. 61, 970 (1957), for an amine titration with indicators.

In accordance with the method of this invention, an unknown acid surface solid can be characterized by the similarity of its titration curve to that of other materials of known acidity. The solid curve of FIGURE 3 shows an experimental titration curve for the 87 weight percent silica-13 weight percent alumina promoted with a metal whereby its acidity could not be determined by the use of indicators because of its dark color. As shown in FIGURE 3, the solid curve falls between curves designated by interrupted lines. These latter curves are for the non-metal promoted 87 weight percent silica-13 weight percent alumina catalyst pre-equilibrated with 0.075 and 0.100 milliequivalent of butylamine per gram, respectively. Therefore, the tests illustrated in FIGURE 3 show that between 0.075 and 0.100 milliequivalent per gram of strong acid sites have been covered or deactivated by the promotion with metal, leaving approximately 0.20 milliequivalent per gram of strong and medium strength acid sites.

That neither the dispersion medium nor the standard titrating liquid in themselves contributed to the potential measured across the electrodes during the tests described above is indicated by the fact that addition of n-butylamine solution to a non-acidic solid dispersion, or to the acetonitrile dispersion medium alone, had no appreciable effect upon electrode potential.

Additional tests were conducted to further illustrate that the method of this invention measures the acidity of an acetonitrile-solid suspension rather than the acidity of the suspension liquid itself by showing the effect of removal of solid acidic particles from the suspension liquid. A suspension containing the 87 weight percent silica-13 weight percent alumina catalyst having a particle size smaller than 74 microns dispersed in acetonitrile was found to have a potential of —0.32 volt and was found to require more than 0.25 milliequivalent of n-butylamine per gram of dispersed solid for neutralization to 0.0 millivolt. When a duplicate sample was filtered through No. 50 Whatman paper the measured potential of the filtrate dropped to —0.2 volt. The filtrate recovered from a second and a third filtration each measures only —0.1 volt and the filtrate recovered from the third titration was found to require only 0.007 milliequivalent of n-butylamine per gram of solid originally present in the solution for neutralization to 0.0 millivolt.

In a similar test wherein centrifuging, rather than filtration, was employed to remove the acidic solid, the 75 weight percent silica-25 weight percent alumina catalyst having a particle size smaller than 74 microns dispersed in acetonitrile possessed a potential 0.1 volt greater than the supernatant liquid recovered upon centrifuging. This supernatant liquid required only about 1/25 of the number of milliequivalents of n-butylamine per gram of solid originally present in the solution for neutralization of 0.0 millivolt as was required by the dispersion prior to centrifuging.

Various changes and modifications can be made without departing from the spirit of this invention and the scope thereof as defined in the following claims.

We claim:

1. A process comprising subdividing an anhydrous solid acidic material to a particle size at least as small as 74 microns, dispersing said granulated anhydrous solid in an anhydrous aliphatic liquid nitrile, said acidic solid being substantially incapable of interacting with said anhydrous aliphatic liquid nitrile, said acidic solid being substantially incapable of dissolving in said anhydrous aliphatic liquid nitrile, at least 0.5 gram of said solid being employed for every 150 milliliters of dispersion volume, immersing a glass electrode which is permeable to hydrogen ions and a standard electrode into said dispersion, said electrodes being in circuit with a potentiometer, allowing said dispersion to stand for a duration sufficient to produce a constant measured potential across said electrodes, and measuring said potential.

2. Claim 1 wherein said nitrile is acetonitrile.

3. A process comprising subdividing anhydrous solid alumina to a particle size at least as small as 74 microns, dispersing said granulated anhydrous solid in an anhydrous aliphatic liquid nitrile, at least 0.5 gram of said solid being employed for every 150 milliliters of dispersion volume, immersing a glass electrode which is permeable to hydrogen ions and a standard electrode into said dispersion, said electrodes being in circuit with a potentiometer, allowing said dispersion to stand for a duration sufficient to produce a constant measured potential across said electrodes, and measuring said potential.

4. Claim 3 wherein said nitrile is acetonitrile.

5. A process comprising subdividing an anhydrous solid silica-alumina to a particle size at least as small as 74 microns, dispersing said granulated anhydrous solid in an anhydrous aliphatic liquid nitrile, at least 0.5 gram of said solid being employed for every 150 milliliters of dispersion volume, immersing a glass electrode which is permeable to hydrogen ions and a standard electrode into said dispersion, said electrodes being in circuit with a potentiometer, allowing said dispersion to stand for a duration sufficient to produce a constant measured potential across said electrodes, and measuring said potential.

6. Claim 5 wherein said nitrile is acetonitrile.

7. A process comprising subdividing a silica-alumina solid material to a particle size at least as small as 74 microns, calcining said granulated solid at a temperature of at least 1000° F. for at least 3 hours, dispersing said granulated calcined solid in an anhydrous aliphatic liquid nitrile, at least 0.5 gram of said solid being employed for every 150 milliliters of dispersion volume, immersing a glass electrode which is permeable to hydrogen ions and a standard electrode into said dispersion, said electrodes being in circuit with a potentiometer, allowing said dispersion to stand for a duration sufficient to produce a constant measured potential across said electrodes, and measuring said potential.

8. Claim 7 wherein said nitrile is acetonitrile.

9. A process comprising subdividing a silica-alumina solid material to a particle size at least as small as 74 microns, conditioning said granulated solid to adjust its water content to a desired level, dispersing said solid in an anhydrous aliphatic liquid nitrile before an appreciable change in water content occurs, at least 0.5 gram of said solid being employed for every 150 milliliters of dispersion volume, immersing a glass electrode which is permeable to hydrogen ions and a standard electrode into said dispersion, said electrodes being in circuit with a potentiometer, allowing said dispersion to stand for a duration sufficient to produce a constant measured potential across said electrodes, and measuring said potential.

10. Claim 9 wherein said nitrile is acetonitrile.

11. A process comprising immersing a glass electrode which is permeable to hydrogen ions and a standard electrode, said electrodes being in circuit with a potentiometer, in a dispersion of anhydrous granulated solid silica-alumina material having a particle size at least as small as 74 microns in an anhydrous aliphatic liquid nitrile, at least 1 gram of said solid being employed for every 150 milliliters of dispersion volume, allowing said dispersion to stand for a duration sufficient to produce a constant potential across said electrodes, adding an anhydrous organic standard alkaline liquid, and measuring the potential of said dispersion during the addition of said standard alkaline liquid.

12. Claim 11 wherein said nitrile is acetonitrile.

13. Claim 12 wherein said alkaline liquid is n-butylamine.

References Cited in the file of this patent

"Analytical Chemistry," vol. 24 (1952), pages 1304–1306, article by Plank; vol. 26 (1954), pages 770 and 771, article by Warner et al; vol. 28 (1956), pages 792–797, article by Cundiff et al.

"Glass Electrode," by Dole (1941), page 226.

"Journal of Physical Chem.," vol. 61 (1957), pages 970–973, article by Benesi.

"Glass Electrode," by Dole (1941), pages 254 and 255.